(12) United States Patent
Lee et al.

(10) Patent No.: US 8,557,951 B2
(45) Date of Patent: Oct. 15, 2013

(54) COPOLYMER POLYESTER RESIN AND MOLDED PRODUCT USING SAME

(75) Inventors: Myoung Ruoul Lee, Seoul (KR); Jong Ryang Kim, Gyeonggi-do (KR); Nam Jung Kim, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 249 days.

(21) Appl. No.: 13/130,629

(22) PCT Filed: Nov. 20, 2009

(86) PCT No.: PCT/KR2009/006853
§ 371 (c)(1),
(2), (4) Date: May 23, 2011

(87) PCT Pub. No.: WO2010/062082
PCT Pub. Date: Jun. 3, 2010

(65) Prior Publication Data
US 2011/0230634 A1    Sep. 22, 2011

(30) Foreign Application Priority Data

Nov. 28, 2008 (KR) .................. 10-2008-0119620

(51) Int. Cl.
*C08G 63/00* (2006.01)
(52) U.S. Cl.
USPC ........ 528/307; 528/271; 528/272; 528/308.6; 528/308.7; 264/176.1; 264/328.1
(58) Field of Classification Search
USPC ........ 528/271, 272, 307, 308.1, 308.6, 308.7; 264/176.1, 328.1
See application file for complete search history.

(56) References Cited

U.S. PATENT DOCUMENTS

| 6,924,349 B2 * | 8/2005 | Lee et al. ............ 528/272 |
| 6,927,275 B2 | 8/2005 | Hirokane et al. |
| 2004/0059084 A1 | 3/2004 | Hirokane et al. |
| 2004/0260054 A1 | 12/2004 | Lee et al. |
| 2005/0026088 A1 * | 2/2005 | Greener et al. ............ 430/401 |
| 2007/0015852 A1 * | 1/2007 | Akutagawa et al. ......... 523/201 |
| 2008/0081873 A1 * | 4/2008 | Kanae et al. .................. 525/63 |

FOREIGN PATENT DOCUMENTS

| CN | 1495217 A | 5/2004 |
| EP | 0893248 A1 | 1/1999 |
| KR | 10-2006-0038666 | 5/2006 |
| KR | 10-2008-0054575 | 6/2006 |
| KR | 10-2008-0043587 A | 5/2008 |
| KR | 10-2008-0054575 | 6/2008 |
| WO | WO 98-26929 | 6/1998 |

OTHER PUBLICATIONS

International Search Report dated Jun. 28, 2010 in PCT/KR2009/006853.
Chinese Search Report, dated Aug. 27, 2012 in CN200980147955.7.

* cited by examiner

*Primary Examiner* — Frances Tischler
(74) *Attorney, Agent, or Firm* — Richard M. Klein; Fay Sharpe LLP

(57) ABSTRACT

The present invention relates to a copolymer polyester resin and a molded product using the same and more specifically to a copolymer polyester resin that contains 10~80 mol % of 1,4-cyclohexane dimethanol, 0.1~30 mol % of a cyclohexane dimethanol compound expressed as $HOH_2C—[C_6H_{12}]_m—[C_6H_{12}]—CH_2OH$ (where m is an integer from 1~10), and ethylene glycol as the remainder so that the sum of the entire diol composition may be 100 mol % based on an aromatic dicarboxylic acid. The copolymer polyester of the present invention enables superior products to be provided that reduce cycle time and enhance product processability during mold processing using a heat-shrinking label by complementing low temperature shrinkage properties that may be exhibited by the polyester resin of the prior art copolymerized with 1,4-cyclohexane dimethanol.

12 Claims, No Drawings

COPOLYMER POLYESTER RESIN AND MOLDED PRODUCT USING SAME

TECHNICAL FIELD

The present invention relates to a copolymer polyester resin containing 1,4-cyclohexane dimethanol and a molded product using the same, and more particularly, to a heat shrinkable polyester based resin composition, which is remarkably suitable for use in labels, and to a film using the same.

BACKGROUND ART

Heat shrinkable plastic products have the property of shrinking when heated and are widely utilized for films such as shrink packages, shrink labels, etc. In particular, polyvinyl chloride (PVC), polystyrene, and polyester based plastic films have been used to label or cap seal a variety of vessels or to directly package them.

However, films made of PVC are subject to environmental restrictions because their incineration may generate hydrogen chloride gas and a dioxin-causing material. If this product is used as a shrink label of a PET vessel, the recycling of the vessel can be carried out only after the cumbersome separation of the label and the vessel from each other.

Also, polystyrene based films may be very stably worked when undergoing the shrinking process and have a good external appearance, but have poor chemical resistance, undesirably requiring that an ink having a specific composition be used for printing. Furthermore, this film is problematic because it shrinks spontaneously because of poor storage stability at room temperature, undesirably deforming the dimensions thereof.

Films made of polyester resin without such problems are receiving considerable attention as a shrink label while substituting for the films made of the above two materials. Moreover, as the use of PET vessels increases, polyester films which may be easily regenerated without the need to separately remove the label upon recycling of the vessels are being increasingly used. However, the shrinking properties of conventional heat-shrinking polyester films must be improved. Because of drastic changes in shrinkage behavior, these films may wrinkle or shrink non-uniformly, undesirably causing frequent problems during a molding process of their shape deviating from an intended design. Also, compared to PVC based films or polystyrene based films, polyester films are poor in terms of shrinkability at low temperature, and thus should be shrunk only at high temperature. In this case, PET vessels are undesirably deformed or becomes white turbid.

DISCLOSURE

Technical Problem

Accordingly, the present invention has been devised to solve the problems encountered in the related art, and is intended to provide a copolymer polyester resin, which may complement poor low-temperature shrinkability and enables the reduction of cycle time and the improvement of product processability during mold processing using a heat-shrinking label, and a heat-shrinking film including the same.

Technical Solution

An aspect of the present invention provides a copolymer polyester resin, which contains 10~80 mol % of 1,4-cyclohexane dimethanol, 0.1~30 mol % of a cyclohexane dimethanol based compound represented by Formula 1 below, and ethylene glycol as the remainder so that the sum of the entire diol composition is 100 mol % based on an aromatic dicarboxylic acid.

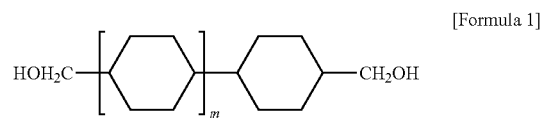

[Formula 1]

wherein m is an integer of 1~10.

Another aspect of the present invention provides a molded product, produced by extruding or injection molding the copolymer polyester resin.

Advantageous Effects

According to the present invention, a copolymerized polyester resin includes a specific cyclohexane dimethanol based compound, so that the shrinkage initiation temperature of the copolymerized polyester resin is lowered, thus enabling heat shrinkage at low temperature similar to that of PVC, thereby preventing deformation or white turbidity of a PET vessel which conventionally resulted upon heat shrinking of a film. Furthermore, the shrinkage speed can be easily controlled, thus reducing molding defects.

BEST MODE

Hereinafter, a detailed description will be given of the present invention.

In the present invention, upon preparation of a copolymerized polyester resin containing 1,4-cyclohexane dimethanol, a diol comprising a cyclohexane dimethanol based derivative represented by Formula 1 is used, so that the resulting polyester resin has sufficient processability to produce a film which may be subjected to heat shrinkage at low temperature. Also, the present invention provides a molded product using such a polyester resin.

According to the present invention, the copolymer polyester resin is prepared by esterification in the first step and polycondensation in the second step.

In the first step, esterification may be carried out in batch or continuous process, and respective materials may be separately added, or terephthalic acid in a slurry form may be added to glycol.

More specifically, an aromatic dicarboxylic acid and a glycol including ethylene glycol and 1,4-cyclohexane dimethanol are reacted with each other. Particularly useful as the dicarboxylic acid is terephthalic acid.

As such, the glycol is added at a molar ratio of 1.2~3.0 based on the dicarboxylic acid, so that esterification is carried out under conditions of 230~260° C. and 1.0~3.0 kg/cm², and the reaction temperature for esterification may be 240~260° C., and particularly 245~255° C., but the present invention is not limited thereto.

Also, esterification typically requires 100~300 min, which may appropriately vary depending on the reaction temperature, the reaction pressure, and the molar ratio of dicarboxylic acid to glycol, but the present invention is not limited thereto.

In the present invention, the glycol compound is used to enhance processability or other properties of a homopolymer composed exclusively of terephthalic acid and ethylene glycol, and may include 1,4-cyclohexane dimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexane dimethanol and 1,3-cyclohexane dimethanol. Particularly useful as the glycol compound, which improves the properties of the homopolymer, is 1,4-cyclohexane dimethanol.

In the present invention, 1,4-cyclohexane dimethanol may include cis-isomer, trans-isomer, or a mixture of two isomers, and may be used in an amount close to desired mol % in a final polymer, and particularly in the amount of 10~80 mol % based on the total amount of the entire diol composition in order to prevent processability from deteriorating due to crystallization. As one of the diol compositions, ethylene glycol may be added so that the sum of the entire diol composition is 100 mol % based on the dicarboxylic acid taking into consideration the amount of 1,4-cyclohexane dimethanol.

Esterification needs no catalyst, but a catalyst may be optionally added in order to shorten the reaction time.

In the present invention, the diol comprising the cyclohexane dimethanol based derivative is represented by Formula 1 below.

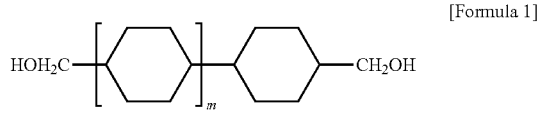

[Formula 1]

wherein m is an integer of 1~10.

The diol represented by Formula 1 may be used in the amount of 0.1~30 mol % based on the total amount of dicarboxylic acid. If the amount of diol is less than 0.1 mol %, it is difficult to improve the properties by the addition of the diol of Formula 1. In contrast, if the amount thereof exceeds 30 mol %, the resulting film may have remarkably decreased heat resistance, undesirably decreasing its usability as a heat-shrinking film.

In the case where the diol represented by Formula 1 is used to substitute for a portion of the dicarboxylic acid of the copolymer polyester resin comprising terephthalic acid, the heat-shrinking film may have a lowered shrinkage initiation temperature and thus may reduce the cycle time when passing through a steaming process, resulting in improved productivity. Also, because the shrinkage speed is slow upon low-temperature shrinking, efficient process control is possible, advantageously decreasing the defective rate. The diol compound represented by Formula 1 may include dicyclohexane dimethanol, tricyclohexane dimethanol, tetracyclohexane dimethanol, pentacyclohexane dimethanol, and mixtures thereof.

After the completion of esterification in the first step, a second step of polycondensation is out. Typically useful upon polycondensation of the polyester resin, a polycondensation catalyst, a stabilizer and a coloring agent may be selectively used.

Usable in the present invention, the polycondensation catalyst is titanium, germanium, and antimony compounds, but the present invention is not limited thereto.

The titanium based catalyst is generally used as a polycondensation catalyst of a copolymer polyester resin prepared by using 15 wt % or more of 1,4-cyclohexane dimethanol based on the weight of terephthalic acid. Even when the titanium based catalyst is used in an amount smaller than the amount of an antimony based catalyst, the reaction may take place. Also, the price of a titanium based catalyst is lower than that of a germanium based catalyst.

Examples of the titanium based catalyst usable in the present invention may include tetraethyl titanate, acetyltripropyl titanate, tetrapropyl titanate, tetrabutyl titanate, tetrabutyl titanate, polybutyl titanate, 2-ethylhexyl titanate, octyleneglycol titanate, lactate titanate, triethanolamine titanate, acetylacetonate titanate, ethylacetoacetic ester titanate, isostearyl titanate, titanium dioxide, coprecipitates of titanium dioxide and silicon dioxide, and coprecipitates of titanium dioxide and zirconium dioxide.

The amount of the polycondensation catalyst, which affects the color of a final polymer, may vary depending on a desired color and the kind of stabiliser and coloring agent. The polycondensation catalyst may be used in the amount of 1~100 ppm of the titanium element based on the weight of the final polymer, and particularly in the amount of 1~50 ppm of the titanium element, and is used in the amount of 10 ppm or less of the silicon element. As such, if the amount of the titanium element is less than 1 ppm, a desired degree of polymerization cannot be obtained. In contrast, if the amount thereof exceeds 100 ppm, the color of the final polymer undesirably becomes yellow.

Also, a stabilizer and a coloring agent may be used as additional additives. The stabilizer usable in the present invention may include phosphoric acid, trimethyl phosphate, triethyl phosphate and triethyl phosphonoacetate, and may be used in the amount of 10~100 ppm of a phosphorus element based on the weight of the final polymer. If the amount of the stabilizer is less than 10 ppm, it is difficult to ensure a desired bright color. In contrast, if the amount thereof exceeds 100 ppm, the degree of polymerization cannot reach the desired high level.

The coloring agent usable to improve the color in the present invention may include a typical coloring agent such as cobalt acetate and cobalt propionate, and may be used in the amount of 0~100 ppm based on the weight of the final polymer.

In addition to the above examples of the coloring agent, any organic compound may be used so long as it is conventionally known.

After the addition of these components, polycondensation in the second step may be carried out at 260~290° C. under a reduced pressure of 400~0.1 mmHg, but the present invention is not limited thereto.

Polycondensation is carried out for the period of time required to reach the desired intrinsic viscosity, and the reaction temperature thereof is set to 260~290° C., particularly 260~280° C., and more particularly 265~275° C.

Also, polycondensation is carried out under a reduced pressure of 400~0.1 mmHg to eliminate glycol produced as a by-product, thereby obtaining the copolymer polyester resin containing 1,4-cyclohexane dimethanol.

As mentioned above, because the copolymer polyester resin according to the present invention has a low shrinkage initiation temperature and thus a slow shrinkage speed, efficient process control is possible, thereby exhibiting a processability sufficiently high that defective rates are reduced. Hence, the copolymer polyester resin is molded by extrusion and stretching, so that a heat-shrinking film product having high processability can be obtained.

A better understanding of the present invention may be obtained in light of the following examples and comparative examples which are set forth to illustrate, but are not to be construed as limiting the present invention.

The properties in the examples and comparative examples were measured according to the following methods.

◎ Glass Transition Temperature (Tg): Tg was measured using a differential scanning calorimeter available from TA Instruments.

◎ Heat Shrinkage Rate: A sample was cut to a square shape having a size of 10 cm×10 cm, immersed in warm water at the temperature shown in Table 1 below under no load for 10 sec and thus heat shrunk, and then immersed in water at 25° C. for 10 sec, after which the length of the sample in longitudinal and transverse directions was measured and then substituted into the following equation.

Heat Shrinkage Rate (%)=100×(length before shrinkage−length after shrinkage)/(length before shrinkage)

◎ Melt Resistivity (Ωcm): A pair of electrode plates were inserted into a chip or film melted at 275° C., and a voltage of 120 V was applied thereto. The current at that time was measured, after which the measured values were substituted into the following equation, thus determining the melt resistivity Si (Ωcm).

$$Si=(A/I)\times(V/io)$$

wherein A is the electrode area (cm$^2$), I is the distance (cm) between the electrodes, V is the voltage (V), and io is the current (A).

In the case where copolymer polyester was prepared using such a device, the following results could be obtained.

Mode For Invention

EXAMPLE

Example 1

In order to prepare a copolymer polyester resin, 138 g of 1,4-cyclohexane dimethanol, 502 g of ethylene glycol and 188 g of dicyclohexane dimethanol, based on 6 mol terephthalic acid, were placed into a 3 l reactor equipped with a stirrer and a discharge condenser and mixed to carry out the reaction while the temperature therein was gradually increased to 255° C.

As such, generated water was discharged to the outside, so that esterification was carried out. After the completion of the generation and discharge of water, the resulting esterification product was transferred into a polycondensation reactor equipped with a stirrer, a cooling condenser and a vacuum system.

The esterification product was added with 0.5 g of tetrabutyl titanate, 0.4 g of triethyl phosphate and 0.5 g of cobalt acetate. While the internal temperature of the reactor was increased from 240° C. to 275° C., ethylene glycol was removed in a low vacuum atmosphere of 50 mmHg which was arrived at by decreasing from atmospheric pressure for 40 min. Subsequently, the pressure was gradually reduced to 0.1 mmHg to create a high vacuum atmosphere under which the reaction was carried out until the desired intrinsic viscosity was obtained. The reaction product was removed from the reactor and cut into the form of chips.

Then, using the copolymer polyester resin containing 1,4-cyclohexane dimethanol, a heat-shrinking film was produced and the glass transition temperature, shrinkage initiation temperature, heat shrinkage rate, and melt resistivity thereof were measured according to the methods cited above. The results are shown in Table 1 below.

Example 2

A copolymer polyester resin was prepared in the same manner as in Example 1, with the exception that 268 g of dicyclohexane dimethanol was added. Subsequently, a heat-shrinking film was produced therefrom, and the glass transition temperature, shrinkage initiation temperature, heat shrinkage rate, and melt resistivity of the heat-shrinking film were measured. The results are shown in Table 1 below.

Example 3

A copolymer polyester resin was prepared in the same manner as in Example 1, with the exception that 210 g of tricyclohexane dimethanol was added. Subsequently, a heat-shrinking film was produced therefrom, and the glass transition temperature, shrinkage initiation temperature, heat shrinkage rate, and melt resistivity of the heat-shrinking film were measured. The results are shown in Table 1 below.

Comparative Example 1

A copolymer polyester resin was prepared in the same manner as in Example 1, with the exception that dicyclohexane dimethanol was not added. A heat-shrinking film was then produced therefrom, and the glass transition temperature, shrinkage initiation temperature, heat shrinkage rate, and melt resistivity of the heat-shrinking film were measured. The results are shown in Table 1 below.

Comparative Example 2

A heat-shrinking film was produced from a PVC resin, and the glass transition temperature, shrinkage initiation temperature, heat shrinkage rate, and melt resistivity of the heat-shrinking film were measured. The results are shown in Table 1 below.

TABLE 1

|  | Ex. 1 | Ex. 2 | Ex. 3 | C. Ex. 1 | C. Ex. 2 |
|---|---|---|---|---|---|
| Glass Transition Temp. (Tg, ° C.) | 70 | 59 | 64 | 79 | 65 |
| Shrinkage Initiation Temp. (° C.) | 59 | 45 | 52 | 71 | 50 |
| Max. Heat Shrinkage Rate (at 60° C.) | 4% | 6% | 5% | 0% | 5% |
| Max. Heat Shrinkage Rate (at 85° C.) | 80% | 79% | 79% | 78% | 65% |
| Melt Resistivity (×10$^8$ Ωcm) | 0.15 | 0.14 | 0.12 | 0.13 | 0.16 |

The invention claimed is:

1. A copolymer resin useful for a heat-shrinking film, which contains 10~80 mol % of 1,4-cyclohexane dimethanol, 0.1~30 mol % of a cyclohexane dimethanol based compound represented by Formula 1 below, and ethylene glycol as a remainder so that a sum of the entire diol composition is 100 mol % based on an aromatic dicarboxylic acid:

[Formula 1]

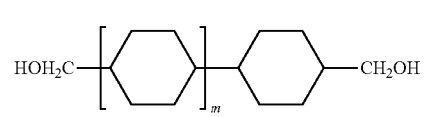

wherein m is an integer of 2~10.

2. The copolymer polyester resin of claim 1, wherein the diol compound represented by Formula 1 is one or more selected from the group consisting of dicyclohexane dimethanol, tricyclohexane dimethanol, tetracyclohexane dimenthanol, pentacyclohexane dimethanol, and mixtures thereof.

3. The copolymer resin of claim 1, wherein the aromatic dicarboxylic acid is terephthalic acid.

4. A molded product, produced by extruding or injection molding the copolymer polyester resin of claim 1.

5. The molded product of claim 4, wherein the molded product is a heat-shrinking film.

6. The molded product of claim 4, wherein the molded product has a shrinkage initiation temperature of 60° C. or lower, and a maximum heat shrinkage rate at 60° C. of 2% or more.

7. The molded product of claim 4, wherein the molded product has a maximum heat shrinkage rate at 85° C. of 50% or more.

8. The molded product of claim 5, wherein the heat-shrinking film has a glass transition temperature in the range of from 59° C. to 70° C.

9. The molded product of claim 5, wherein the heat-shrinking film has a glass transition temperature in the range of from 59° C. to 64° C.

10. The molded product of claim 5, wherein the heat-shrinking film has a glass transition temperature in the range of from 64° C. to 70° C.

11. The copolymer resin of claim 1, wherein m is 4 or 5.

12. The copolymer resin of claim 1, wherein the copolymer resin consists of the 1,4-cyclohexane dimethanol, the cyclohexane dimethanol based compound of Formula 1, the ethylene glycol, the aromatic dicarboxylic acid, a polycondensation catalyst, a phosphorus-based stabilizer, and a coloring agent.

* * * * *

UNITED STATES PATENT AND TRADEMARK OFFICE
CERTIFICATE OF CORRECTION

PATENT NO. : 8,557,951 B2  Page 1 of 1
APPLICATION NO. : 13/130629
DATED : October 15, 2013
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this
Fifteenth Day of September, 2015

Michelle K. Lee
*Director of the United States Patent and Trademark Office*